(12) United States Patent
Sundararajan et al.

(10) Patent No.: US 10,112,516 B2
(45) Date of Patent: Oct. 30, 2018

(54) DUAL FUNCTION STOWABLE ARMREST

(71) Applicants: FORD GLOBAL TECHNOLOGIES, LLC, Dearborn, MI (US); Yanfeng US Automotive Interior Systems I LLC, Holland, MI (US)

(72) Inventors: Srinivasan Sundararajan, Ann Arbor, MI (US); Kevin Michael Pline, Plymouth, MI (US); Derek Board, Ferndale, MI (US); Rick Anderson, Holland, MI (US); Ronald Anthony Bozio, Holland, MI (US); David John McCarthy, Holland, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 135 days.

(21) Appl. No.: 15/238,999

(22) Filed: Aug. 17, 2016

(65) Prior Publication Data

US 2018/0050617 A1 Feb. 22, 2018

(51) Int. Cl.
| | |
|---|---|
| B60N 2/46 | (2006.01) |
| B60N 2/75 | (2018.01) |
| B60N 2/02 | (2006.01) |
| B60N 2/427 | (2006.01) |
| B60N 3/00 | (2006.01) |
| B60N 3/02 | (2006.01) |

(52) U.S. Cl.
CPC .......... *B60N 2/753* (2018.02); *B60N 2/0232* (2013.01); *B60N 2/42727* (2013.01); *B60N 2/42781* (2013.01); *B60N 3/00* (2013.01); *B60N 3/02* (2013.01)

(58) Field of Classification Search
CPC ................ B60N 2/4606; B60N 2/0232; B60R 2021/0273; B60R 21/02
USPC ........................................................ 296/153
See application file for complete search history.

(56) References Cited

U.S. PATENT DOCUMENTS

| | | | |
|---|---|---|---|
| 5,527,084 | A | 6/1996 | Scherf |
| 6,145,919 | A | 11/2000 | Mysliwiec et al. |
| (Continued) | | | |

FOREIGN PATENT DOCUMENTS

| | | |
|---|---|---|
| DE | 10307481 A1 | 9/2004 |
| JP | 2007253672 A | 10/2007 |
| WO | 2013156098 A1 | 10/2013 |

OTHER PUBLICATIONS

English Machine Translation of DE10307481A1.
English Machine Translation of JPJ2007253672A.
English Machine Translation of WO2013156098A1.

*Primary Examiner* — Pinel E Romain
(74) *Attorney, Agent, or Firm* — Vichit Chea; King & Schickli PLLC

(57) ABSTRACT

An armrest assembly for a vehicle includes a displaceable armrest element and a linkage assembly. The linkage assembly is configured for translating the displaceable armrest element between a deployed configuration and a folded configuration. The linkage assembly includes a spring-actuated pivoting over-center link configured to disengage the linkage assembly to allow the displaceable armrest element to rotate. An actuator is provided which on sensing an impact ruptures a frangible fastener holding the over-center link in a substantially parallel orientation to at least one drive link, thereby allowing the spring-actuated over-center linkage to pivot relative to the at least one drive link.

20 Claims, 3 Drawing Sheets

(56) References Cited

U.S. PATENT DOCUMENTS

| | | | |
|---|---|---|---|
| 6,568,743 B1 | 5/2003 | Jayasuriya et al. | |
| 6,837,544 B2 | 1/2005 | Bornchen et al. | |
| 7,237,825 B1* | 7/2007 | Tilli | B60J 5/0416 |
| | | | 296/146.7 |
| 9,216,675 B2* | 12/2015 | Jayasuriya | B60N 2/464 |
| 9,233,660 B1* | 1/2016 | Farooq | B60N 2/466 |
| 9,649,916 B2* | 5/2017 | Hamdoon | B60J 5/0456 |
| 2015/0203065 A1* | 7/2015 | Egusa | B60R 7/04 |
| | | | 280/730.2 |

* cited by examiner

DUAL FUNCTION STOWABLE ARMREST

TECHNICAL FIELD

This disclosure relates generally to armrests for vehicle doors. More particularly, the disclosure relates to a stowable or displaceable armrest for a vehicle door, providing dual functions of increased passenger cabin space and side impact performance.

BACKGROUND

In addition to the primary function of a vehicle armrest of providing a surface on which a vehicle occupant may rest his or her arm, armrests are required to support both vertical and horizontal loads to meet durability and side impact requirements. A secondary function of an armrest is to provide a reaction surface for a side impact air bag, for example disposed in a vehicle door, during a side impact collision event.

However, the increasing stature and girth of the average vehicle occupant (and of crash dummies used to test vehicle crash performance) provides a reduced gap between a vehicle occupant and an armrest, concurrently impairing side impact air bag deployment and ultimately side impact performance. There is accordingly a need identified in the art for armrest designs which compensate for the reduced gap between occupant and armrest, thereby improving side impact performance.

To solve this and other problems, the present disclosure relates to a displaceable armrest. Advantageously, the disclosed displaceable armrest is configured to translate from a deployed orientation to a folded orientation on detection of a side or other impact, thereby improving passenger cabin space and side impact performance.

SUMMARY

In accordance with the purposes and benefits described herein, in one aspect an armrest assembly for a vehicle is described, comprising a displaceable armrest element and a linkage assembly. The linkage assembly is configured for translating the displaceable armrest element between a deployed configuration and a folded configuration. In embodiments, the displaceable armrest element rotates about a vehicle x-axis to the folded configuration when released by the linkage assembly.

In embodiments, the displaceable armrest element is biased to the folded configuration by one or more hinge springs. In embodiments, the linkage assembly comprises a spring-actuated pivoting over-center link configured to disengage the linkage assembly to allow the displaceable armrest element to rotate. An actuator is provided which on sensing an impact ruptures a frangible fastener holding the over-center link in a substantially parallel orientation to at least one drive link, thereby allowing the spring-actuated over-center linkage to pivot relative to the at least one drive link. In embodiments the actuator is one of a pyrotechnic actuator or a motor.

In other aspects, vehicle door assemblies and vehicles including the above armrest assembly are described.

In the following description, there are shown and described embodiments of the disclosed displaceable armrest. As it should be realized, the device is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed displaceable armrest, and together with the description serve to explain certain principles thereof. In the drawing.

Reference will now be made in detail to embodiments of the disclosed armrest assembly, examples of which are illustrated in the accompanying drawing figures.

DETAILED DESCRIPTION

Figure 1:
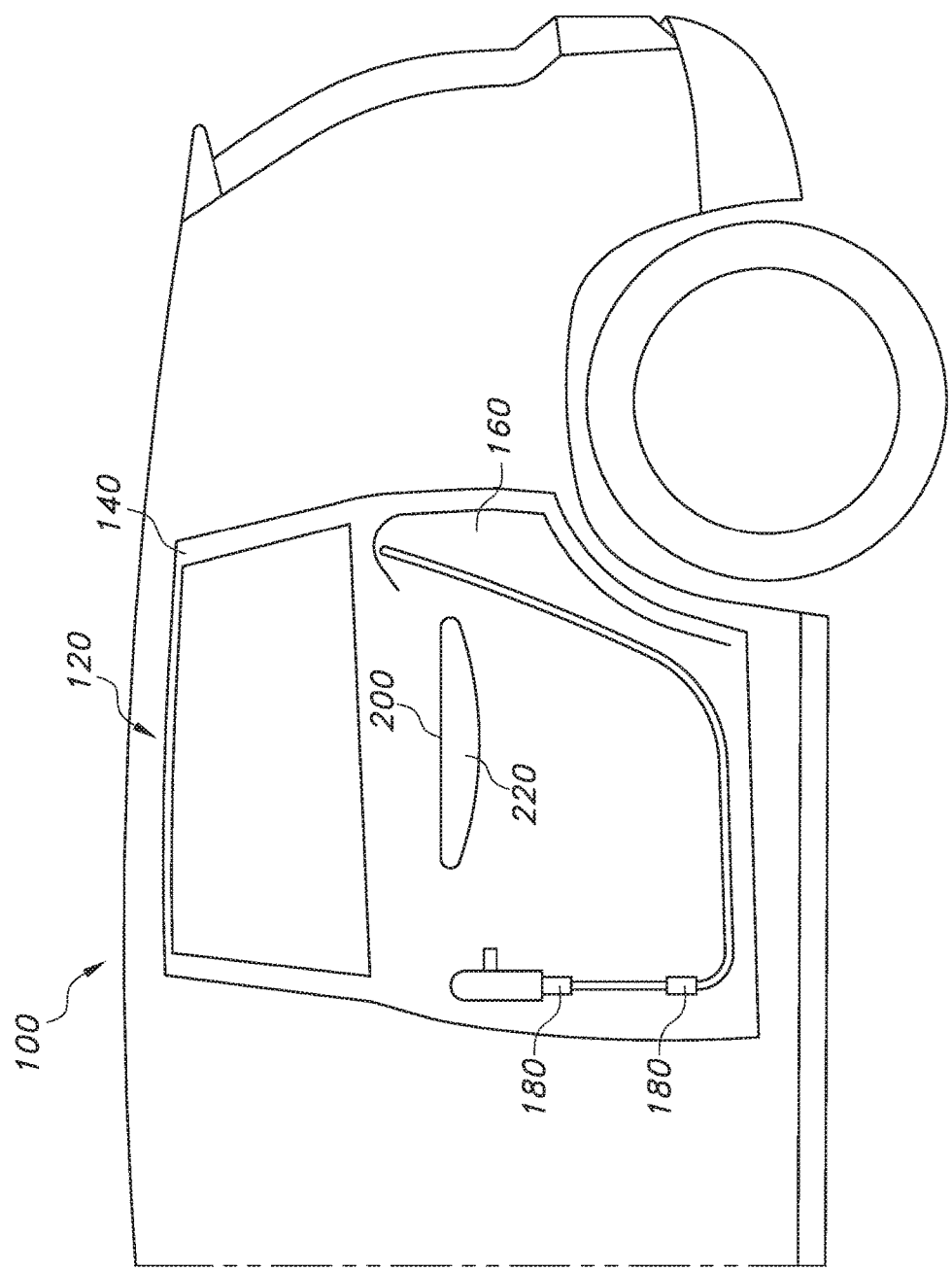
FIG. 1 depicts a vehicle including a door assembly.

With reference to FIG. 1, a vehicle 100 including a door assembly 120 is shown. The basic design of a door assembly 120 is known, and does not require extensive discussion herein. However, at a high level a vehicle door assembly 120 typically includes at least a door panel 140, one or more overlying trim pieces 160, one or more hinge members 180, and a locking/latching assembly 200 which in the depicted embodiment is associated with a door-mounted armrest 220, typically being formed by a horizontal platform covered by one or more trim, padding, and/or covering pieces.

Figure 2:
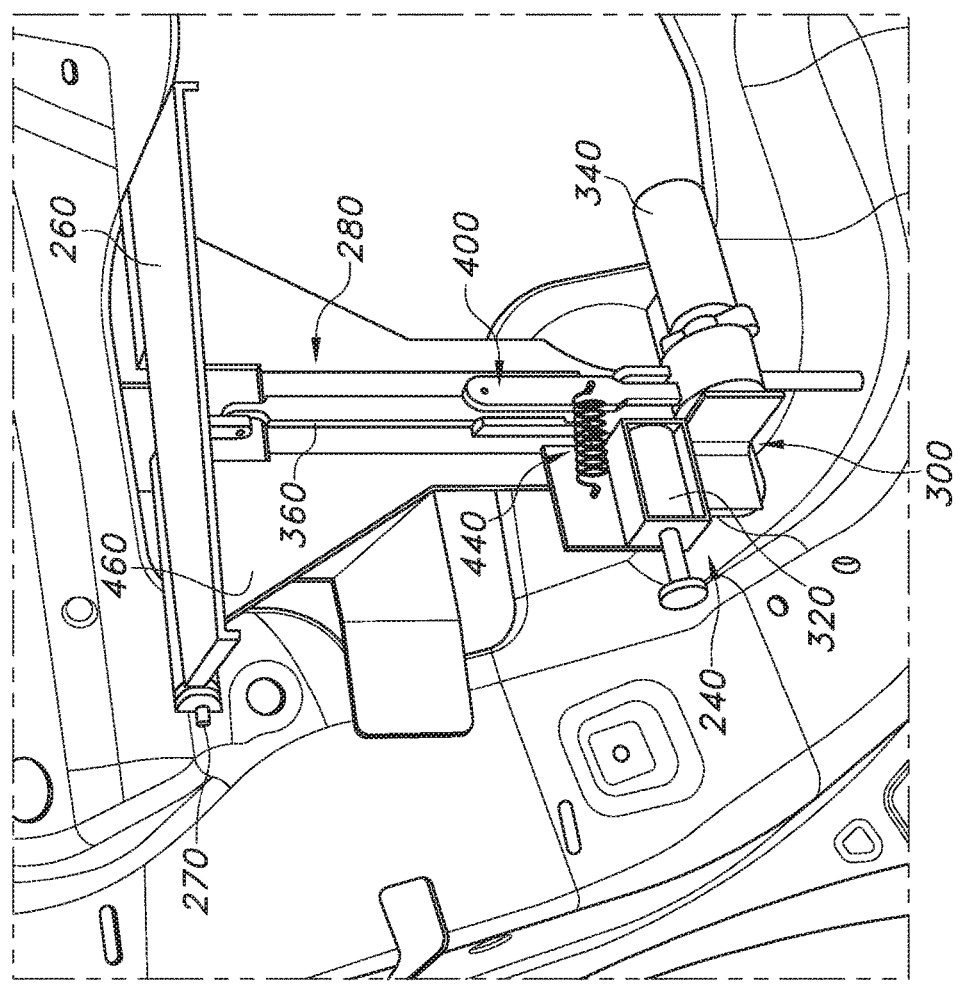
FIG. 2 depicts an armrest assembly according to the present disclosure.

As described above, the armrest 220 may impair side impact air bag deployment and ultimately side impact performance. To solve this and other problems, with reference to FIG. 2 the present disclosure is directed to an armrest assembly 240. The armrest assembly 240 includes a displaceable armrest element 260 and a linkage assembly 280. The displaceable armrest element 260 is configured for translation between the deployed configuration shown in FIG. 2 and a folded configuration (see arrows) substantially flush against the door panel 140 by a suitable resilient element 270, in the depicted embodiment being one or more hinge springs. As discussed above, the folded configuration provides additional space between the folded armrest element 260 and a vehicle occupant (not shown), thereby increasing the space available for, e.g., side airbag deployment.

An actuator assembly 300 is provided, which as will be described in greater detail below effects rupture of a frangible fastener to disengage the linkage assembly 280 to allow the armrest element 260 to translate to the folded configuration. In embodiments, the actuator assembly 300 may include one or both of a pyrotechnic actuator 320 and a motor 340. The motor 340 is operatively connected to the engaged linkage assembly 280 to raise and lower the displaceable armrest element 260 as needed. The actuator assembly 300 is operatively connected to an impact sensor 360 which, on sensing a side or other impact, causes the pyrotechnic actuator 320 to effect rupture of the frangible fastener. A number of suitable impact sensors 360 are known in the art, including as a non-limiting example impact sensors used in association with air bag assemblies, for deploying airbags on detection of an impact to the vehicle.

Alternatively, other accelerometer-based impact sensors are known in the art and contemplated for use herein.

The linkage assembly 280 comprises a series of links held in a substantially collinear orientation by a frangible fastener. The linkage assembly 280 when in this collinear configuration counters the rotating bias imposed on the displaceable armrest element 260 by the resilient element 270. In one embodiment (see FIG. 3A), the linkage assembly 280 is defined by at least one drive link 360 and an intermediate spring-loaded pivoting over-center linkage 400 comprising a pair of links 400a, 400b. The drive links 360, 380 and the spring-loaded pivoting over-center link 400 are held in a collinear orientation (see FIG. 3A) by a frangible fastener 420, in the depicted embodiment being a shear pin, and a resilient member 440, in the depicted embodiment being a spring.

Figure 3B:
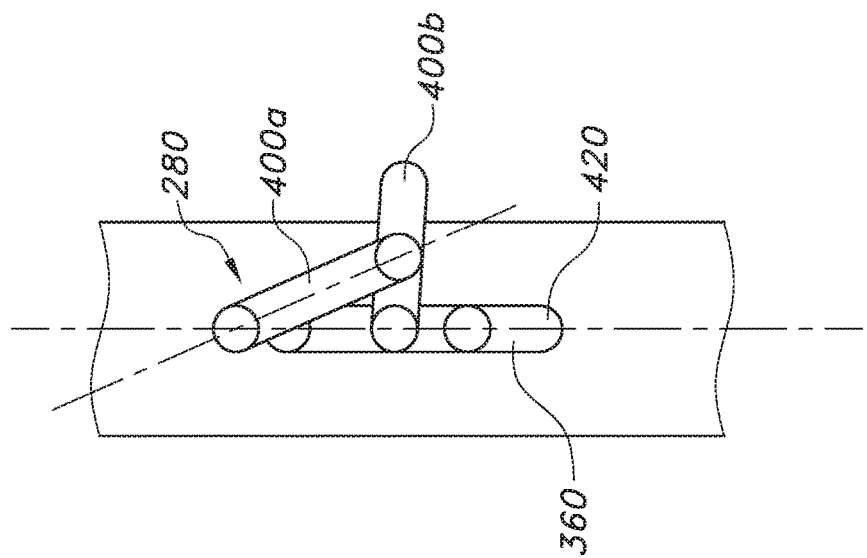
FIG. 3B shows the linkage assembly of FIG. 3A in a disengaged configuration.
Figure 3A:
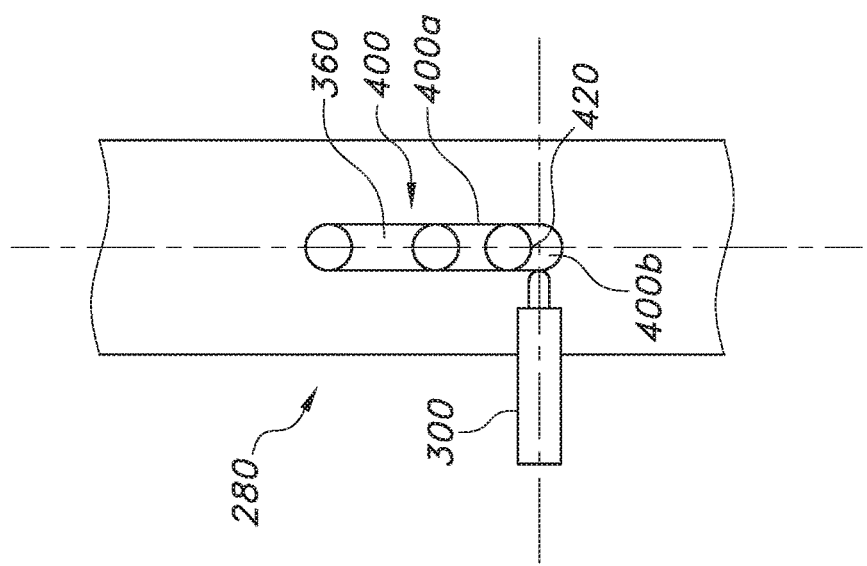
FIG. 3A shows a linkage assembly for use in the armrest assembly of FIG. 2.

The actuator assembly 300 is disposed whereby actuating same will rupture the frangible fastener 420, releasing the spring-loaded pivoting over-center linkage 400 which then pivots, disengaging the collinear orientation of the drive link 360/spring-loaded pivoting over-center linkage 400 (FIG. 3B). Once the linkage assembly 280 is so disengaged, the countering force imposed on the resilient element 270 by the linkage assembly is released and the displaceable armrest element 260 rapidly translates to the folded configuration by way of the biasing force imposed by the resilient element.

In that regard, a number of pyrotechnic actuators 320 are known in the art, including without intending any limitation pyrotechnic actuators comprising a pyrotechnic device and a drivable piston which, when actuated, impacts the linkage assembly at the spring-loaded pivoting over-center linkage 400 with sufficient force to rupture the frangible fastener 420 to disengage the linkage assembly 280, allowing the displaceable armrest element 260 to translate to the folded configuration as described. Alternatively, the pyrotechnic actuator 320 could be disposed to displace (rather than rupture) a pin holding the linkage assembly 280 in the described collinear orientation, disengaging the linkage assembly (embodiment not shown). Still more, electromechanical lock devices are known which could hold the linkage assembly 280 in the described collinear orientation until an electrical charge is released to displace the spring-loaded pivoting over-center linkage 400 (embodiment not shown). All such alternatives are contemplated.

The armrest assembly 240 is attached to a suitable substrate such as a door panel 140 by a bracket 460 which includes a central track 480 within which the at least one drive link 360 slidingly translates to fold or unfold the displaceable armrest element 260. As will be appreciated, this central track 480 directs the sliding translation of the at least one drive link 360 to ensure a controlled movement thereof when folding/unfolding the displaceable armrest element 260.

Obvious modifications and variations are possible in light of the above teachings. All such modifications and variations are within the scope of the appended claims when interpreted in accordance with the breadth to which they are fairly, legally and equitably entitled.

What is claimed:

1. An armrest assembly for a vehicle, comprising:
   a displaceable armrest element; and
   a linkage assembly adapted to releasably retain the displaceable armrest element in a deployed configuration.

2. The armrest assembly of claim 1, wherein the displaceable armrest element rotates about a vehicle x-axis to a folded configuration when released by the linkage assembly.

3. The armrest assembly of claim 2, wherein the displaceable armrest element is biased to the folded configuration by one or more hinge springs.

4. The armrest assembly of claim 1, wherein the linkage assembly comprises a spring-actuated pivoting over-center link configured to disengage the linkage assembly to allow the displaceable armrest element to rotate.

5. The armrest assembly of claim 4, further including a first actuator operatively linked to the displaceable armrest assembly by the linkage assembly to translate the displaceable armrest element between the deployed configuration and the folded configuration.

6. The armrest assembly of claim 4, further including a second actuator which on sensing an impact ruptures a frangible fastener holding the spring-actuated pivoting over-center link in a substantially parallel orientation to at least one drive link, thereby allowing the spring-actuated pivoting over-center link to pivot relative to the at least one drive link to disengage the linkage assembly.

7. The armrest assembly of claim 6, wherein the first actuator is a motor and the second actuator is a pyrotechnic actuator.

8. A vehicle door assembly including the armrest assembly of claim 1.

9. A vehicle door assembly, comprising:
   a vehicle door element;
   a displaceable armrest element hingedly connected to the vehicle door element; and
   a linkage assembly adapted to releasably retain the displaceable armrest element in a deployed configuration.

10. The vehicle door assembly of claim 9, wherein the displaceable armrest element rotates about a vehicle x-axis to a folded configuration when released by the linkage assembly.

11. The vehicle door assembly of claim 10, wherein the displaceable armrest element is hingedly connected to the vehicle door element by one or more hinge springs.

12. The vehicle door assembly of claim 9, wherein the linkage assembly comprises a spring-actuated pivoting over-center link configured to disengage the linkage assembly to allow the displaceable armrest element to rotate.

13. The vehicle door assembly of claim 12, further including a first actuator operatively linked to the displaceable armrest assembly by the linkage assembly to translate the displaceable armrest element between the deployed configuration and the folded configuration.

14. The armrest assembly of claim 13, further including a second actuator which on sensing an impact ruptures a frangible fastener holding the spring-actuated pivoting over-center link in a substantially parallel orientation to at least one drive link, thereby allowing the spring-actuated pivoting over-center link to pivot relative to the at least one drive link to disengage the linkage assembly.

15. The armrest assembly of claim 14, wherein the first actuator is a motor and the second actuator is a pyrotechnic actuator.

16. A vehicle door assembly, comprising:
    a vehicle door element;
    a displaceable armrest element hingedly connected to the vehicle door element to translate between a deployed configuration and a folded configuration; and
    a linkage assembly comprising at least one drive link and a spring-actuated pivoting over-center link configured to disengage the linkage assembly to allow the displaceable armrest element to translate; and a frangible fastener holding the over-center link in a substantially parallel orientation to the at least one drive link.

17. The vehicle door assembly of claim 16, further including an actuator which on sensing an impact ruptures the frangible fastener.

18. The vehicle door assembly of claim 17, wherein the actuator is a pyrotechnic actuator.

19. The vehicle door assembly of claim 16, wherein the displaceable armrest element rotates about a vehicle x-axis to the folded configuration when released by the linkage assembly.

20. A vehicle including the vehicle door assembly of claim 16.

* * * * *